United States Patent Office 2,839,575
Patented June 17, 1958

2,839,575
OXIDATION OF ALKYL-SUBSTITUTED BENZENE CARBOXYLIC ACIDS

Lloyd C. Fetterly, El Cerrito, Calif., assignor to Shell Development Company, New York, N. Y., a corporation of Delaware No Drawing. Application May 27, 1954
Serial No. 432,911

9 Claims. (Cl. 260—524)

This invention relates to a process for the oxidation of alkyl-substituted aromatic compounds and, more particularly, to a process for the production of aromatic dicarboxylic acids and their esters by oxidation of alkyl-substituted aromatic monocarboxylic acids and esters thereof, in liquid phase with a molecular oxygen-containing gas. In recent years the production of aromatic dicarboxylic acids, such as terephthalic acid, has become highly desirable, for it has been found that where terephthalic acid is esterified by one or more appropriate alcohols, especially glycols, the resulting esters possess properties which render their polymers valuable as intermediates in the production of synthetic fibres. Thus, there has been much interest in developing a process for the efficient, low-cost production of these acids or their alkyl esters from cheap, readily available raw materials. The primary raw materials considered have been such hydrocarbons as the xylenes, and other alkyl-substituted benzenes, toluic acids and the like. In general, the processes for converting these hydrocarbons or benzene monocarboxylic acids to the desired benzene dicarboxylic acids have involved the oxidation of the hydrocarbons using one or more oxidizing agents to effect the reaction.

Employment of molecular oxygen (usually in the presence of a suitable catalyst) as oxidizing agent has been proposed and has been effective to some extent in producing the desired dicarboxylic acids, but its use has introduced problems to which there have been found no satisfactory solutions. When alkylated aromatic compounds contain several oxidizable alkyl groups, or when the alkyl substituent groups contain relatively longer chains, it has been found that the oxidation of the first alkyl group oxidizable to a carboxyl group takes place with more or less ease, but that the subsequent oxidation of the thus obtained alkylated aromatic monocarboxylic acid to the dicarboxylic acid, etc., is infinitely more difficult, so that it is very difficult to obtain the dicarboxylic acids by this method.

The primary object of the present invention, therefore, is to solve these problems by presenting a method whereby aromatic dicarboxylic acids and esters of these acids may be prepared in satisfactory yields by a process which employs a reaction mixture which is not corrosive, which provides for excellent control of the oxidation, and which uses readily available materials for effecting the reaction.

It has now been discovered that alkyl-substituted aromatic monocarboxylic acids and their esters may be converted in good yields to the corresponding dicarboxylic acids by the oxidation of a mixture comprising the monocarboxylic acid or ester and one or more of nitrogen dioxide, organic nitrates and organic nitrites which release —O—N=O or

radicals in anhydrous liquid phase with a molecular oxygen-containing gas at attractively low temperatures and pressures.

Thus, toluic acids, for example, may be oxidized to the corresponding phthalic acids by molecular oxygen, under conditions of pressure and temperature at which the monocarboxylic acid is relatively inert to the attack of oxygen by conducting the oxidation in the presence of at least one of the class, nitrogen dioxide ($NO_2$), organic nitrates and organic nitrites which release

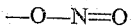

or

radicals. Of this class it is preferred to use nitrogen dioxide or an organic nitrate or nitrite of the stated class in which the organic component is the same as the hydrocarbon component of the monocarboxylic acid to be oxidized; for example, when oxidizing p-toluic acid or an alkyl ester thereof, the preferred nitrogen-containing component is either nitrogen dioxide or a nitrate or nitrite of p-toluic acid, or the alkyl ester thereof.

The nitrogen-containing component of the reaction mixture may be added to the reaction zone initially or it may be added continuously during the oxidation or at both times. If preferred, the oxidation may be effected by first reacting the monocarboxylic acid with nitrogen dioxide alone, at a temperature and pressure at which nitrated or nitrited products capable of being oxidized to the desired dicarboxylic acid are formed, then adding the molecular oxygen-containing gas and using these products as the nitrogen-containing components of the reaction mixture. The maintenance of a constant concentration of the nitrogen-containing component in the reaction theater is important and, therefore, it is preferred that the nitrogen-containing component be added to the reaction mixture either continuously or incrementally in a manner to be described. When nitrogen dioxide is used, the preferred technique requires that it be added to the molecular oxygen-containing gas and thoroughly mixed with that gas before it is contacted with the monocarboxylic acid. The nitrogen dioxide may be added continuously to the molecular oxygen-containing gas stream, but it is preferred that it be added to this stream in incremental or pulsating manner.

For example, it has been found that high conversion level may be maintained once oxidation has begun by passing an oxygen-containing gas continuously through the reaction mixture and adding nitrogen dioxide only occasionally as necessary to maintain the desired conversion level. A demonstration of this technique and its beneficial effects is given in Example II. It has been found, in contrast, that the addition of an equal amount of nitrogen dioxide continuously but at a lower rate does not maintain the conversion level obtainable by the preferred technique. By the employment of this method of adding the nitrogen dioxide, it has been found possible to effect the oxidation smoothly and continuously and to increase the desired conversion substantially. Where organic nitrates or nitrites of the class herein defined are employed they are preferably added continuously so as to maintain these concentrations in the reaction mixture at a constant level.

The concentration of the nitrogen-containing component, whether it be nitrogen dioxide or an organic nitrate or nitrite, is measured by the concentration of

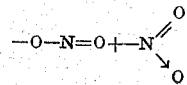

radicals present in the reaction mixture. It is desirable that the concentration of these radicals in the reaction zone not exceed a certain maximum. For practical purposes, the concentration of these radicals may be measured in terms of the weight of the compounds present in the reaction zone which release these radicals. It has been found that the desired effect is obtained when the weight of the compounds releasing these radicals does not exceed about 2% by weight of the monocarboxylic acid present, and for optimum conversion it is desirable that this concentration level of these compounds lie within the range of from about 0.01% to 1.0% by weight of the monocarboxylic acid present in the reaction zone. When organic nitrates or nitrites are used they are added in sufficient amounts to maintain the desired concentration of nitrogen-containing compounds in the reaction zone without reference to the rate at which oxygen is fed. However, where nitrogen dioxide is used, the amount of this gas must not only be adjusted to maintain the desired concentration of nitrogen-containing compounds in the reaction zone but must also be adjusted to the rate at which oxygen is fed. In general, the ratio of oxygen to nitrogen dioxide should not exceed about 5 volumes of oxygen to 1 volume of nitrogen dioxide but this ratio should always be in excess of about 0.5 volume of oxygen to 2.5 volume of nitrogen dioxide. A preferred range of proportions is from about 3:1 to about 1:1 (vol. $O_2$:vol. $NO_2$).

The rate at which oxygen is fed to the reaction zone is not critical, being adjusted so as to provide an excess of oxygen within the reaction zone at all times. The rate of oxygen flow is primarily determined by the physical characteristics and limitations of the reaction system— e. g., pressure, temperature, nature of reactants and product, type of reactor, method of contacting the oxygen with the reactants, and so on. Any method for contacting the oxygen with the reactants may be employed, the sole criterion being that intimate contact must be established and maintained at all times.

The nitrogen dioxide may be supplied in the form of pure nitrogen dioxide gas or liquid or it may be supplied in the form of a mixture of gases of which nitrogen dioxide forms at least a major part. In this latter case care should be taken (a) that the other components of the mixture are inert with respect to all of the components of the reaction mixture; and (b) that the proportion of nitrogen dioxide to oxygen fed lies with the limits stated. Two particularly desirable sources of nitrogen dioxide are found in the vapors obtained by the thermal (catalytic or non-catalytic) oxidation of ammonia, the vapors obtained from the thermal cracking of nitric acid. The mixture of nitrogen oxides obtained from the oxidation of ammonia is desirable for the reason that it has been found that this mixture substantially reduces the induction period of the monocarboxylic acid, thus increasing the overall conversion of the acid with time. The mixture of vapors obtained by the cracking of nitric acid provide a particularly desirable source of nitrogen dioxide and other radicals which effectively increase the conversion of the monobasic acid to the dibasic acid. The cracking of nitric acid occurs primarily according to two equations:

a  $\qquad 2HNO_3 = 2NO_2 + \tfrac{1}{2}O_2 + H_2O$ b  $\qquad HNO_3 = NO_2 + HO$ The mixture of vapors resulting from the cracking of nitric acid thus comprises a mixture of $NO_2$, $O_2$, $H_2O$ and various organic radicals. These vapors have been found to speed the reaction of the monobasic acid with oxygen and to force that reaction to completion to a greater degree than any other source of $NO_2$—in some instances the reaction rate is increased over that obtainable with $NO_2$ or organic nitrites or nitrates of the stated class by as much as 500%. The cracked nitric acid vapors may be conveniently prepared by passing the vapors of either anhydrous $HNO_3$ or the vapors of an aqueous solution thereof through a hot tube, the temperature of which is preferably above about 250° C., but below about 450° C. The vapors so obtained may be employed directly to effect the desired oxidation, or they may be mixed with air or other source of molecular oxygen. It must be emphasized that in order that the desired effect on the oxidation of the monobasic acid be obtained, the liquid reaction mixture must be maintained in a substantially anhydrous condition. Therefore, where such cracked nitric acid vapors are used, and especially where those vapors were obtained by cracking the vapors from an aqueous solution of nitric acid, especial precautions must be taken to insure that all of the water be removed from the reaction mixture. If a liquid water phase is allowed to form, undesirable side reaction between the oxides of nitrogen present and other components of the reaction mixture may result. An alternative to cracking the nitric acid vapors before passing the vapors into the reaction zone comprises passing vaporous nitric acid directly into the anhydrous reaction mixture, providing means for removing all water that may be incoming with nitric acid, or otherwise. In such case, decomposition cracking of the nitric acid, formation of nitrogen dioxide and other radicals, and oxidation of the monobasic acid all occur substantially at the same time in the reaction zone itself.

It is preferred that where an organic nitrite or nitrate is employed, that the organic component of such nitrite or nitrate be substantially hydrocarbon in nature and, even more preferably, that it be identical to the hydrocarbon component of the monocarboxylic acid reactant. The organic nitrates and nitrites which may be employed are those which release —$NO_2$ or —$ONO$ radicals. An excellent source of these organic nitrites and nitrates is the reaction products of the monocarboxylic acid to be oxidized and nitrogen dioxide, according to the methods stated in the prior art. For example, nitrates and nitrites may be formed by absorbing $NO_2$ in the monocarboxylic acid maintained at a temperature just below its boiling point. Examples of other organic nitrates and nitrites which have been found suitable for effecting the desired oxidation are the nitroalkanes and alkyl nitrites, characterized by the formulas: alkyl—$NO_2$ and alkyl—$ONO$, respectively, such as nitroethane, 1- and 2-nitropropane, the various nitrobutanes and nitroisobutanes, amyl and isoamyl nitrite and the like. Excluded are the alkyl nitrates, which are characterized by the formula, alkyl—$ONO_2$. Also effective are the nitrites or nitrates of alkyl-substituted benzenes in which the —$ONO$ or —$NO_2$ group is linked to a carbon atom of the alkyl substituent group and not to a carbon atom of the benzene ring. Examples of this class of compounds are tolyl nitrite, phenylnitromethane, the isomeric xylyl nitrites, tolylnitromethane, the corresponding carboxylic acids and the esters thereof.

It must again be emphasized that, in order to obtain the desirable high levels of conversion without excessive loss of the effective nitrogen dioxide (by conversion to $N_2O$) and without excessive side-reaction to produce undesirable by-products, the concentration of water in the liquid reaction zone must be maintained at as low a level as possible and preferably the system is maintained in an anhydrous state. The presence of even small amounts of water in the reaction zone leads to the undesirable results noted above. Removal of water from the reaction zone may be effected by venting the vapors evolved during reaction, condensing the vapors outside of the reaction zone, separating the condensed water and returning any organic component to the system additively or alternatively dehydrating agents may be used in the reaction zone itself. If dehydrating agents are employed, care must be taken to insure that such agents are inert with respect to all the components of the reaction mixture.

The monocarboxylic acids which may be oxidized to dicarboxylic acids according to the process of the invention are the aromatic monocarboxylic acids which contain one or more oxidizable alkyl substituents and include, among others, the toluic acids, the tertiary butyl benzoic acids, the mesitylenic acids, the cumic acids and similar polyalkyl-substituted aromatic monocarboxylic acids. The alkyl esters of such acids as these may be further oxidized to form the partial esters of the dicarboxylic acids. A preferred class of these esters comprises those esters in which each of the alkyl groups is a lower alkyl group, preferably having not more than 8 carbon atoms per group. A most desirable class of these esters comprises those in which the esterifying group is the methyl group. Alkyl-substituted aromatic monocarboxylic acids having other substituent groups on either the ring or on the alkyl substituents may also be oxidized according to the process of the invention, providing that the substituent groups other than the alkyl groups are inert—e. g., do not themselves oxidize and do not inhibit the oxidation of the alkyl groups.

The oxidation is carried out by intimately contacting an oxygen-containing gas (which term includes molecular oxygen itself) with a mixture of the monocarboxylic acid and nitrogen dioxide or an organic nitrate or nitrite of the defined class in liquid phase, or by intimately contacting the monocarboxylic acid in liquid phase with a mixture of the oxygen-containing gas and nitrogen dioxide. The liquid phase is composed of the monocarboxylic acid (if it is a liquid at the conditions of temperature and pressure contemplated) and/or, an organic compound which is a liquid at the operating conditions. The organic liquid may act as either a dispersant or as a solvent. It is preferred that the organic liquid be a solvent for the monocarboxylic acid. Where the acid is a vapor at the temperature and pressure employed, the use of a solvent or dispersant is essential, but where the acid is a liquid at the conditions employed, a solvent or dispersant is not always necessary, although its use may be desirable. The criteria for determining the necessity for the use of a solvent or dispersant are as follows: (a) the reaction mixture must be in what is essentially a liquid phase; (b) the reaction mixture must be readily fluid—e. g., if the dicarboxylic acid product is insoluble or only partially soluble in the monocarboxylic acid reactant, sufficient solvent or dispersant must be employed to either dissolve the dicarboxylic acid or to suspend that acid in the reaction mixture as a dilute suspension. As an alternative to the use of solvent or dispersant in the latter case, it may be found practicable to remove the dicarboxylic acid by filtration as formed, recycling the liquid monocarboxylic acid to the reaction zone for further oxidation. In any case, where a solvent is used that solvent must conform to certain requirements: (a) it must be a good solvent for the monocarboxylic acid (and preferably for the dicarboxylic acid also); (b) it must be inert with respect to the monocarboxylic acid reactant in the dicarboxylic acid product under the reaction conditions employed; (c) it must be inert with respect to oxidation under conditions employed; (d) it must be inert with respect to the reaction initiator used under the reaction conditions; and (e) it must remain a liquid at the temperatures and pressures involved. Organic compounds which have been found suitable for use as a solvent or dispersant include aromatic hydrocarbons, such as benzene and its substitution products—e. g., alkyl-substituted benzenes such as tert-butyl benzene and the like, halogen-substituted benzenes, such as chlorobenzene, o- and p-dichlorobenzene, and the like. Also suitable as the solvent are the aliphatic carboxylic acids, lower monocarboxylic acids such as acetic and propionic acids being preferred; the methyl and ethyl esters of such acids; aliphatic ketones such as diisobutyl ketone; and aliphatic and aromatic nitriles, such as acetonitrile and benzonitrile.

The amount of solvent or dispersant employed is not a critical factor in the process of the invention. In case a solvent is used, it should be used in an amount sufficient to dissolve all of the aromatic monocarboxylic acid. A moderate excess—50% to 100% excess—usually is desirable. If a dispersant is used, it should be used in an amount sufficient to form a dilute suspension with the monocarboxylic acid.

It is preferred that a catalyst be present in the reaction mixture. Suitable compounds for this purpose are those compounds known in the art to be catalysts for the oxidation of alkyl-substituted benzenes to the corresponding mono- or dicarboxylic acids with molecular oxygen under more extreme conditions of temperature and pressure than are used in this new process. Such catalysts include inter alia at least one compound or complex either organic or inorganic of heavy polyvalent metals— for example, the organic or inorganic salts, the oxides, the chelates, or the complexes of the polyvalent heavy metals having an atomic number of from about 23 to about 82. The salts or other compounds or complexes of cerium, cobalt, manganese, vanadium, and chromium, are all suitable as catalyst. Specific examples of this class of compounds are the chlorides of vanadium, cerium, cobalt, and manganese; the acetates of iron (ferric) cobalt, zinc, bismuth, manganese, lead and copper; the naphthenates of these compounds; cobalt or barium permanganate. Mixtures of two or more of these compounds are also satisfactory. A preferred group of these catalysts comprises the organic compounds, chelates, or complexes of cobalt in which the cobalt is present in a cationic portion of the molecule. A still more preferred group of cobalt compounds comprises the salts of cobalt with organic acids and the chelates of cobalt with organic compounds such as the diketones. Examples of this class include cobalt acetate, cobalt p-toluate, cobalt naphthenate, cobalt stearate, cobalt octoate, cobalt salicylate, cobalt acetonate, and cobalt isovalerylacetonate. The amount of catalyst charged need constitute but from about 100 p. p. m. (0.01%) to about 1% by weight of the monocarboxylic acid used.

The oxidation is effected at a temperature within the range of from about 100° C. and below about 250° C. In general, it will be found that temperature lying between about 120° C. and about 200° C. are to be preferred, for these temperatures enable a smooth, effective oxidation of the desired monocarboxylic acid to the corresponding dicarboxylic acid at high conversion levels with the occurrence of one or two amounts of undesirable side reactions.

In general, the oxidation may be effectively carried out at substantially atmospheric pressure, although in some cases it will be found that the reaction progresses in a more desirable manner under the moderate pressure. Such pressure need not exceed about 100 p. s. i. g. and generally a pressure of from about 30 to about 60 p. s. i. g. will be found quite sufficient to give the desired degree of conversion, although pressures to as high as 1000 pounds per square inch can be used.

This constitutes a general description of the process of the invention; the following examples illustrate specific application of this process. It is to be understood that these examples are for the purpose of illustration only and that the invention is not to be regarded as limited in any way to the specific conditions cited therein.

*Example I*

A. 50 grams of crude mixed m- and p-toluic acids were dissolved in 180 ml. of o-dichlorobenzene. No catalyst was employed. The mixture was heated to 180° C. and held at that temperature by gently boiling the solvent. Air was passed into the mixture via a fritted glass bubbler at the rate of 0.0045 mole per minute. The pressure was 1 atmosphere absolute. The air flow was continued for 5 hours. No reaction was noted—none of the oxygen in the air was absorbed.

B. The above run was repeated, $NO_2$ being added at the rate of 0.0015 mole/minute. Oxidation, as evidenced by oxygen absorption, began almost immediately following the addition of the $NO_2$. The run was continued for 2 hours. The oxidation rate, as measured by conversion of monobasic to dibasic acid, was approximately 10% per hour.

At the end of the 2 hour period, the $NO_2$ feed was halted. The oxidation rate quickly fell to zero.

C. Run B was repeated, substituting for the $NO_2$ an equivalent amount of anhydrous nitric acid. It was found that anhydrous nitric acid was almost exactly equivalent to $NO_2$ in its effect upon the oxidation.

D. Another equivalent to $NO_2$ was found to comprise a gaseous mixture containing 10–15% of $HNO_3$ vapors, said mixture being prepared by passing air at the rate of approximately 0.0045 mole/min. through a solution saturated with $HNO_3$ vapor at 90° C. This mixture was found equivalent to $NO_2$ or anhydrous $HNO_3$ only so long as adequate precautions were observed to insure that the liquid phase reaction mixture was anhydrous.

*Example II*

A. 100 grams of m-toluic acid were dissolved in 110 ml. o-dichlorobenzene. The mixture was heated to 160–170° C. Air was bubbled through the mixture at the rate of 0.007 moles/min. No catalyst was employed. For the first 20 minutes, no $NO_2$ was added, and no oxidation—no absorption of oxygen—was observed. At the 20th minute, $NO_2$ was added for 60 seconds, at a rate equal to three times that of the air flow. (Approximately 0.021 moles of $NO_2$ were added.) Oxygen absorption began almost immediately following addition of the $NO_2$ and rose to a level at which approximately 97% of the oxygen fed was being absorbed. The oxygen absorption level fell to about 15% at the end of 30 minutes (50 minutes total oxidation time). At the 50th minute, 0.007 mole of $NO_2$ was added over a period of 60 seconds. The oxygen absorption level rose immediately to about 37% and fell slowly to about 19% at the end of 80 minutes (130 minutes total time). At the 130th minute, another 0.007 moles of $NO_2$ were added over a minute period. The oxygen absorption level rose to 35%, fell to 15% at the end of 10 minutes (140 minutes total time). The run was ended at this point.

B. The run was repeated, employing the same charge and temperature conditions, air flow rate, etc. During the first 20 minutes, no $NO_2$ was added, no oxygen absorbed. 0.014 moles of $NO_2$ were then added over a 2 minute period. The oxygen absorption level rose to 55%, fell to 2% at the end of 20 minutes. 0.014 mole of $NO_2$ were then added over a 2 minute period, beginning with the 20th minute. The oxygen absorption level rose to 47%, fell to 1% at the end of 20 minutes (60 minutes total). Then 0.014 mole of $NO_2$ were added over a period of 2 minutes, and 200 p. p. m. cobalt naphthenate were added. The oxygen absorption level rose to 79%, and dropped to 10% in 20 minutes. The effect of the catalyst was to prolong the effect of the $NO_2$ added. Run ended at the end of 80 minutes total.

Run A was repeated, but an amount of $NO_2$ equal to that added during run B was added continuously—e. g., $NO_2$ was added at the rate of about 0.00035 mole per minute. Negligible oxygen absorption was noted, whether or not cobalt naphthenate was present as catalyst.

*Example III*

The effectiveness of organic nitrites and nitrates was demonstrated by the following experimental runs: In all of these runs except run F, the following procedure was followed: A charge of 40% by weight of toluic acid in o-dichlorobenzene and containing 0.02% by weight of cobalt naphthenate as catalyst, was oxidized with air at 155–165° C. at atmospheric pressure by passing air through the solution at the rate of about 0.007 mole per minute. Run F was identical to these other runs, with the sole exception that no catalyst was employed.

The following oxidation rates were obtained over the time period shown. The oxidation rates are expressed in terms of the percent of oxygen fed that was absorbed:

| Nitrate or Nitrite Employed | Length of Run (Min.) | Rate of $O_2$ Absorption | |
|---|---|---|---|
| | | Maximum | Average |
| A. None employed | 70 | 0 | 0 |
| B. 1% by wt. 2-nitropropane | 130 | 73 | 17 |
| C. 1% by wt. nitro-p-toluic acid | 130 | 21 | 11 |
| D. 0.1% by wt. toluene-$NO_2$ reaction product a | 100 | 20 | 15 |
| E. 2.6% by wt. $NO_2$-xylene reaction product b | 100 | 200 | 18 |
| F. 1% by wt. isoamyl nitrite (no catalyst present) | 70 | 7 | 5 | a Prepared by reacting p-toluene with $NO_2$ for 2 hours at a temperature slightly below the boiling point of p-toluene.
b Prepared by reacting p-xylene with $NO_2$ for 2 hours at a temperature slightly below the boiling point of p-xylene.

*Example IV*

25 grams of p-toluate were dissolved in 100 ml. o-dichlorobenzene containing 0.1% by weight of cobalt naphthenate. The mixture was contacted with air at 1 atmosphere pressure and 152° C. The air was added at the rate of 0.004 mole per minute. No absorption of the oxygen was observed. At the end of one hour, 0.004 mole of $NO_2$ were added over a period of 1 minute. Oxidation started almost immediately and continued for one hour, when the run was terminated. Conversion to the half ester of terephthalic acid was 10% based on the methyl p-toluate charged.

*Example V*

Molten m-toluic acid was oxidized at 170° C. by passing vapors derived from cracked nitric acid through the molten acid. The vapors, comprising primarily $NO_2$ and $O_2$, together with some water vapor were prepared by passing the vapors of 70% by weight nitric acid through a hot tube at 180° C. 1 mole of the acid was oxidized. 0.77 mole of the nitric acid was cracked and passed through the molten acid in a period of one-half hour. The average rate of conversion was about 52% per hour. Special precautions were observed to insure that liquid toluic acid was maintained in an anhydrous state throughout the reaction.

I claim as my invention:

1. A process for the production of benzene dicarboxylic acids which comprises intimately contacting in substantially anhydrous liquid phase at a temperature of from about 100° C. to about 250° C., a molecular oxygen-containing gas and a mixture comprising an alkyl-substituted benzene monocarboxylic acid and from about 0.01% to about 2% by weight of said benzene monocarboxylic acid of at least one member of the group consisting of nitrogen dioxide, nitrohydrocarbons and hydrocarbyl nitrites which ionize to give —ONO and —$NO_2$ ions.

2. A process for the production of benzene dicarboxylic acids which comprises intimately contacting in substantially anhydrous liquid phase at a temperature of from about 100° C. to about 250° C. in the presence of an inert organic liquid which is a solvent for the benzene monocarboxylic acid and at least one heavy polyvalent metal compound oxidation catalyst, a molecular oxygen-containing gas and a mixture comprising an alkyl-substituted benzene monocarboxylic acid and from about 0.01% to about 2% by weight of said benzene monocarboxylic acid of at least one member of the group consisting of nitrogen dioxide, nitrohydrocarbons and hydrocarbyl nitrites which ionize to give —ONO and —NO₂ ions.

3. A process for the oxidation of an alkyl-substituted benzene monocarboxylic acid which comprises intimately contacting in substantially anhydrous liquid phase at a temperature of from about 120° C. to about 200° C. an alkyl-substituted benzene monocarboxylic acid with a molecular oxygen-containing gas in the presence of from about 0.01% to about 2% of the weight of said monocarboxylic acid of nitrogen dioxide.

4. A process according to claim 3 wherein the benzene monocarboxylic acid is a toluic acid and the said contacting is conducted in the presence of an inert organic liquid which is a solvent for the benzene monocarboxylic acid.

5. A process for the oxidation of an alkyl-substituted benzene monocarboxylic acid which comprises intimately contacting in substantially anhydrous liquid phase at a temperature of from about 120° C. to about 200° C. an alkyl-substituted benzene monocarboxylic acid with a molecular oxygen-containing gas in the presence of from about 0.01% to about 2% of the weight of said monocarboxylic acid of at least one nitrohydrocarbon which ionizes to give —NO₂ ions.

6. A process for the oxidation of an alkyl-substituted benzene monocarboxylic acid which comprises intimately contacting in substantially anhydrous liquid phase at a temperature of from about 120° C. to about 200° C. an alkyl-substituted benzene monocarboxylic acid with a molecular oxygen-containing gas in the presence of from about 0.01% to about 2% of the weight of said monocarboxylic acid of at least one hydrocarbyl nitrite which ionizes to give —ONO ions.

7. The process of claim 2, wherein the polyvalent metal catalyst comprises at least one cobalt compound.

8. The process of claim 5 in which the organic component of the nitrohydrocarbon is identical to the organic component of the monocarboxylic acid oxidized.

9. The process of claim 6 in which the organic component of the hydrocarbyl nitrite is identical to the organic component of the monocarboxylic acid oxidized.

References Cited in the file of this patent

UNITED STATES PATENTS

| | | |
|---|---|---|
| 1,576,999 | Seydel | Mar. 16, 1926 |
| 2,653,165 | Levine | Sept. 22, 1953 |
| 2,730,524 | Nieuwenhuis | Jan. 10, 1956 |
| 2,749,317 | Pino | June 5, 1956 |
| 2,766,281 | Zienty et al. | Oct. 9, 1956 |

FOREIGN PATENTS

| | | |
|---|---|---|
| 156,252 | Great Britain | Jan. 4, 1921 |

OTHER REFERENCES

Groggins: "Unit Processes in Organic Synthesis," pp. 433–4, McGraw-Hill, 1952.